United States Patent [19]

Disteldorf et al.

[11] Patent Number: 4,986,932

[45] Date of Patent: Jan. 22, 1991

[54] STABILIZER SYSTEM FOR POLYOLEFINS COMPRISED OF MONOCARBOXYLIC ACID ESTERS OF A PIPERIDINOL AND A BENZOPHENONE OR BENZOTRIAZOLE

[75] Inventors: Josef Disteldorf, Marl; Hans-Jurgen Haage; Hubert Libera, both of Herne; Peter Kirchner, Bochum, all of Fed. Rep. of Germany

[73] Assignee: Huels Aktiengesellschaft, Marl, Fed. Rep. of Germany

[21] Appl. No.: 206,802

[22] Filed: Jun. 15, 1988

[30] Foreign Application Priority Data

Jul. 22, 1987 [DE] Fed. Rep. of Germany ....... 3724223

[51] Int. Cl.$^5$ .............................................. C08J 7/06
[52] U.S. Cl. ..................................... 252/403; 524/99; 524/91
[58] Field of Search ..................... 252/403; 524/99, 91

[56] References Cited

U.S. PATENT DOCUMENTS

| | | | |
|---|---|---|---|
| 4,064,102 | 12/1977 | Hillard et al. | 524/102 |
| 4,127,586 | 11/1978 | Rody et al. | 524/91 X |
| 4,344,876 | 8/1982 | Berner | 524/91 |
| 4,369,275 | 1/1983 | Rody | 524/103 |
| 4,472,546 | 9/1984 | Sugis et al. | 524/91 |
| 4,487,870 | 12/1984 | Bartz | 524/91 |
| 4,500,446 | 2/1985 | Durmis et al. | 252/403 |

FOREIGN PATENT DOCUMENTS

| | | |
|---|---|---|
| 0180992 | 8/1967 | European Pat. Off. . |
| 0154071 | 3/1971 | European Pat. Off. . |
| 0099231 | 1/1984 | European Pat. Off. . |
| 50-123748 | 9/1974 | Japan . |
| 51-30258 | 3/1976 | Japan . |
| 57-61031 | 4/1982 | Japan . |
| 57-168933 | 10/1982 | Japan . |

OTHER PUBLICATIONS

Ciba-Geigy, Publ. Nr. 37327/2/d, Sep. 75/Jul. 77/Mar. 80/10, Gedruckt in der Schweiz.
Polymer Photochemistry 6, 1985, pp. 273-291, Julia Lucki.
Polymer Degradation and Stability 2, 1980, pp. 129-135, Norman S. Allen.
Developments in the U.V.-Stabilisation of Polymers, Applied Science Publ. Ltd, London 1979, F. Gugumus.
Polymer Degradation and Stability 3, (1981) p. 199-208, N. S. Allen.

*Primary Examiner*—John S. Maples
*Assistant Examiner*—Valerie D. Fee
*Attorney, Agent, or Firm*—Oblon, Spivak, McClelland, Maier & Neustadt

[57] ABSTRACT

A stabilizer system for stabilization of polyolefins against light, heat, and oxidative degradation, comprising:

(a) a monocarboxylate ester of a polyalkyl-4-piperidinol of the formula:

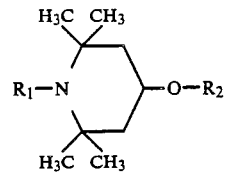

wherein $R_1$ represents hydrogen, a $C_{1-5}$ alkyl group, an allyl or benzyl group, or a $C_{1-4}$ acyl group, and $R_2$ represents a straight or branched chain, saturated or unsaturated $C_{16-24}$ aliphatic carboxylic acyl group; and (b) a benzophenone or benzotriazole UV-absorber.

14 Claims, No Drawings

STABILIZER SYSTEM FOR POLYOLEFINS COMPRISED OF MONOCARBOXYLIC ACID ESTERS OF A PIPERIDINOL AND A BENZOPHENONE OR BENZOTRIAZOLE

BACKGROUND OF THE INVENTION

1. Field of the Invention

The invention relates to a stabilizer system for use as a light-protection agent for polyolefins.

2. Description of the Background

Synthetic thermoplastic high polymers, particularly polyolefins, are known to suffer degradation of their optical and mechanical properties when subjected to light, heat, or atmospheric oxygen. The degradation leads to appreciable cracking, chalking, discoloration, brittleness, and other undesirable effects within the polymer. In order to improve the resistance of the polymers to these degrative influences, stabilizers are added to the polymers in order to counteract these degrative influences. Invariably antioxidants are added to polyolefins so that they are capable of resisting oxidative attack during processing and subsequent use. Beyond this basic stabilization measure, it is customary to add light-stabilizers to the polyolefins in order to extend service life, particularly in outdoor use, because the antioxidants are only slightly effective in suppressing photooxidation caused by the UV component of light. Accordingly, UV absorbers of the benzotriazole or benzophenone type, and/or nickel quenchers, are commonly used for light-stabilization of polyolefins. These stabilizers enable substantial improvement of the light stability of the polyolefins; however, they have some disadvantages as well. Thus, UV absorbers do not provide the polymer surface with adequate protection, since their absorption increases exponentially with the concentration of the agent and the distance from the surface, according to the Beer-Lambert law. The consequence, particularly for thin layers (films, fibers, etc.), is premature surface cracking. Nickel quenchers work well in thin layers, but they are themselves colored (as are the benzophenones) which limits their area of applicability.

The light stability of polyolefins can be increased markedly if derivatives of polyalkylpiperidines are used as light-stabilizers. These substances belong to a class of sterically hindered amines. They are regarded as the most effective light-stabilizers for polyolefins. The preferred such agent for polyolefins is the 2,2,6,6-tetramethyl-4-piperidinol diester of sebacic acid, which is marketed, e.g., by Ciba-Geigy under the trade name TINUVIN® 770, and commands the greatest market share among the sterically hindered amines.

Esters of polyalkyl-4-piperidinols with mono-, di-, and polycarboxylic acids have long been known, and are described, e.g., in Ger. OS 19 29 928. Synthetic polymers such as polyolefins, polyvinyl chloride, polyvinylidene chloride, polyurethanes, and polyamides, are stabilized against photo- and thermal degradation if they contain, among other components, esters of the formula:

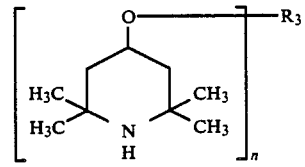

wherein, in the case of an ester of an aliphatic monocarboxylic acid, $n=1$, and $R_3$ is an aliphatic monoacyl group, possibly containing phenyl-group or phenoxy-group substitutions, and having 2 to 18 C atoms. In the case of an ester of an aliphatic dicarboxylic acid, $n=2$, and $R_3$ is an aliphatic diacyl group. Tabular evaluation of the compounds indicates that the dicarboxylic acid diesters of 2,2,6,6-tetramethyl-4-piperidinol are superior to the monocarboxylic acid monoester counterparts, in light-stabilizing action.

Subsequently, a large number of patent and other publications have been concerned with further modification of the ester molecule (see Ger. OSs 22 04 659, 22 58 725, 26 21 870, and 32 33 943) or the addition of other structural elements to the 2,2,6,6-tetraalkylpiperidine.

Also, frequently descriptions are found of the use of mixtures of these compounds with other additives, for light stabilization, whereby synergistic, additive, or antagonistic effects can occur, depending on the structure, stabilizing mechanisms, and the intermediate products occurring in the event of photolysis. Synergistic effects between TINUVIN 770® and benzotriazole absorbers in polypropylene plates have been reported by Gugumus, 1979, in Scott, G., Ed., "Developments in Polymer Stabilization", pub. Appl. Science Publishers, London, pp. 280–308. However, according to Allen et al., 1980, Polymer Degrad. Stab., 2, 129 ff.; 1981 ibid., 3, 199, no synergism can be observed between TINUVIN 770® and benzophenones or benzotriazoles as additives in polypropylene films. According to the data from a study of the interaction between sterically hindered piperidines and UV-absorbers with regard to light-stabilization of polybutadiene (Lucki, 1985, Polymer. Photochem., 6, 273–291), there is antagonism between UV-absorbers of the benzophenone type and sterically hindered piperidines. Also, no synergism with benzotriazole absorbers was detected.

Thus in the publication "Technische Information TINUVIN 770®" [("Technical bulletin TINUVIN 770®")] of the firm Ciba-Geigy, dated 1975, 1977, and 1980, the diagrams for light stability for the combination of the 2,2,6,6-tetramethyl-4-piperidinol diester of sebacic acid with benzotriazole absorbers in polyethylene films show no synergism, and the diagrams for the same combination in polypropylene in thin or thick layers also show no synergism or only slight synergism. Finally it is only noted that the use of UV absorbers as co-stabilizers in connection with thick layers may be of advantage. On the otherhand, in studies with ABS polymer as a substrate, a substantial synergism of the stabilizer mixture was detected.

In the likes of, Ger. OSs 24 17 535 and 33 43 676, and Eur. Patents No. 0 002 753, 0 154 071, and 0 180 992, increased or synergistic light-protective effects are described for mixtures of sterically hindered piperidines with benzotriazoles in connection with PVC, ABS, PUR, polyamides, crosslinked polyolefin foams, and metal-pigment-containing acrylate and polyester paints.

These stability tests were in all cases more successful with sterically hindered piperidines of the dicarboxylate ester or polycarboxylate ester type or with polymeric esters. Nothing is known about the behavior of aliphatic monocarboxylate esters in this connection.

The evaluation criteria described in the literature for tests of light-stabilizing action nearly exclusively involve measurements which relate to the mechanical properties of a polymer, e.g. residual ultimate tensile strength, residual elongation, bendability, reduction of melt viscosity, carbonyl index, and the like. Only with regard to stabilization of paints and varnishes are additional criteria such as surface gloss and cracking evaluated. Thus, quite irrationally, the most important aspect of the light-stabilizing action of sterically hindered amines, namely their outstanding surface protection, is not taken into account in testing polymers. An optically unblemished surface quality is an important criterion in evaluating the useful characteristics of a polymeric material. This objective is not only important from decorative considerations. It turns out in practice that when a combination of sterically hindered amines with UV-absorbers is employed, the ultimate tensile strength, bendability, and the like are no longer the decisive criteria if there is early onset of surface crack formation. That is, the increasing damage to the surface clearly reduces the penetration of harmful radiation, much of which radiation is now scattered or absorbed before penetrating, and as a result the mechanical properties are undegraded for a longer time than is the case with a system in which surface crack formation starts much later. However, despite satisfactory mechanical properties, the usefulness of the material is reduced. The tendency toward relatively early surface crack formation is shown by sterically hindered amines of the dicarboxylate ester type, such as TINUVIN 770 ®. A need therefore continues to exist for an improved stabilizer system for the stabilization of polyolefins.

SUMMARY OF THE INVENTION

Accordingly, one object of the present invention is to provide a stabilizer system which is effective in stabilizing polyolefins against light, heat and oxidative degradation.

Another object of the invention is to provide a polyolefin stabilizer system which exhibits a high degree of surface protection for the polyolefin which substantially inhibits surface crack formation.

Briefly, these objects and other objects of the present invention as hereinafter will become more readily apparent can be attained by a stabilizer system for polyolefins which comprises (a) a monocarboxylate ester of a polyalkyl-4-piperidinol of the formula:

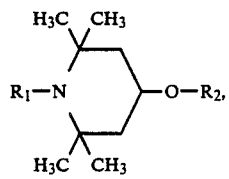

wherein $R_1$ represents hydrogen, a $C_{1-5}$ alkyl group, an allyl or benzyl group, or a $C_{1-4}$ acyl group, and $R_2$ represents a straight or branched chain saturated or unsaturated $C_{16-24}$ aliphatic carboxylic acyl group; and (b) a benzophenone or benzotriazole UV-absorber.

DETAILED DESCRIPTION OF THE PREFERRED EMBODIMENTS

An important aspect of the present invention is the unexpected finding that esters of certain monocarboxylic acids with polyalkyl-4-piperidinol exhibit substantial synergism in mixtures with UV-absorbers of the benzotriazole and benzophenone type, with regard to light-stabilization in polyolefins, which is superior to that experienced with the known, ordinarily commercially used and preferred sebacic acid diester with 2,2,6,6-tetramethyl-4-piperidinol. The performance of the present combination of ingredients is superior particularly with respect to resistance to surface crack formation. This could not have been expected, for the following reason: Both the present ester component and the diester of the prior art are in the same class of chemical compounds; i.e., that of esters. However, the monocarboxylate esters have a content of effective groups (sterically hindered piperidine nitrogen) which is reduced by as much as a factor of 2. It was not foreseeable that the light-stabilizing action of combinations of the monocarboxylate esters with UV-absorbers would clearly exceed that of combinations of TINUVIN 770 ® with UV-absorbers.

It is particularly significant that the present stabilizer system comprised of monocarboxylate esters and UV-absorbers clearly outperforms the system comprised of the sebacic acid diester and UV-absorbers when the amount of sterically hindered piperidine nitrogen is adjusted to the same level, according to the principle of effective group equivalence, wherewith, in a case of equal molecular weight (behenic acid ester), there is nearly twice as much monocarboxylate ester added to the polyolefin. It is noted that there is no particular disadvantage to detract from this result, since, among other things, the manufacturing costs and manufacturing conditions are more favorable for the monocarboxylate esters.

Suitable examples of polyalkyl-4-piperidinol monocarboxylate esters which can be used in the present invention include 2,2,6,6-tetramethyl-4-piperidinyl hexadecanoate, 2,2,6,6-tetramethyl-4-piperidinyl octadecanoate, 2,2,6,6-tetramethyl-4-piperidinyl docosanoate, 1,2,2,6,6-pentamethyl-4-piperidinyl octadecanoate, and 1,2,2,6,6-pentamethyl-4-piperidinyl docosanoate.

The mentioned docosanoate esters are the subject of copending patent application (attorney docket No. 689-159-0).

Two monoester compounds which have been found to be particularly suitable are 2,2,6,6-tetramethyl-4-piperidinyl octadecanoate and 2,2,6,6-tetramethyl-4-piperidinyl docosanoate. Obviously, mixtures of the esters may be employed. No significant difference in results occurs if the mixtures are produced by mixing the individual esters or by using mixtures of the acid predecessors in preparing the esters.

The esters are resistant to hydrolysis, are soluble in polyolefins, and have light-stabilizing action at low concentrations. They have long lasting effectiveness at a high level because they are relatively involatile and have low migration and low extractability.

The preferred starting materials for producing the ester component of the present stabilizer are 2,2,6,6-tetramethyl-4-piperidinol and 1,2,2,6,6-pentamethyl-4-piperidinol . The compounds are commercially available, as are the monocarboxylic acids. Because the higher monocarboxylic acids are obtained from natural products, depending on the degree to which they are refined they may also contain impurities of lower and higher molecular weight carboxylic acids, some of which may be unsaturated, along with other impurities which depend on the particular raw materials used. For example, commercially available behenic acid has a typical composition $C_{22}$ (behenic) acid 87%, $C_{20}$ acid 6%, $C_{18}$ acid 4%, and 1% each of $C_{16}$ and $C_{24}$ acids.

The manufacturing process for the monocarboxylate esters is less costly than processes for the dicarboxylate esters. Two economical methods which may be employed, which are per se generally known and which give high yields are as follows:

(a) Direct esterification of the monocarboxylic acid with the polyalkyl-4-piperidinol, with the use of a catalyst such as, e.g., aluminum triisopropylate or dibutyltin oxide, and possibly with the use of an azeotrope-former such as hexane to remove the water or else with the process carried out in a high-boiling solvent such as xylene or decalin with removal of the liberated water.

(b) Transesterification of a low alkyl ester of the monocarboxylic acid with the polyalkyl-4-piperidinol, in the presence of a catalyst such as tetra-isopropyl titanate, possibly with the use of a solvent which boils at a higher temperature than the low molecular weight aliphatic alcohol of the ester.

For the reaction, the acid component and the polyalkyl-4-piperidinol are mixed in a molar ratio such that the lower boiling component is present in excess. The reaction is carried out at 200° C. with removal of the water or alcohol which is evolved, after which the unreacted components are separated in vacuum. Then the product is refined by distillation in a thin-layer evaporator.

Suitable examples of candidates for UV-absorbers of the benzophenone or benzotriazole type to be used according to the invention include:
2-(2-hydroxy-5-methylphenyl)benzotriazole,
2-(3,5-di-t-butyl-2-hydroxyphenyl)benzotriazole,
2-(3-t-butyl-2-hydroxy-5-methylphenyl)benzotriazole,
2-(3,5-di-t-amyl-2-hydroxyphenyl)benzotriazole,
5-chloro-2-(3,5-di-t-butyl-2-hydroxyphenyl)benzotriazole,
5-chloro-2-(3-t-butyl-2-hydroxy-5-methylphenyl)benzotriazole,
2-hydroxy-4-octyloxybenzophenone,
4-dodecyloxy-2-hydroxybenzophenone, and
2,4-dihydroxybenzophenone.

The present stabilizer system has excellent stabilizing action in synthetic thermoplastic polymers which are subject to degradation by light, heat, or atmospheric oxygen, particularly polymers of mono- or diolefins, such as polyethylene, polypropylene, polyisobutylene, poly-1-butene, poly(methyl-1-pentene), polyisoprene, polybutadiene, polycyclopentene, polydicyclopentadiene, polynorbornene, or mixtures of polymers or copolymers of the olefin monomers such as ethylene-propylene-[buta]diene terpolymer, or copolymers of the olefin monomers indicated above with other vinyl monomers such as, e.g., alkyl acrylates, alkyl methacrylates, acrylonitrile, vinyl acetate, styrene, methylstyrene, and the like.

The amount of the stabilizer system which should be used ranges from 0.01–5 wt. %, based on the weight of the polyolefin being stabilized, preferably 0.05–1 wt. %. The ratio of sterically hindered piperidine to UV-absorber must be determined individually, depending on the intended use of the polyolefin article. Ordinarily this ratio is 3:1 to 1:3, preferably about 1:1. The methods of incorporating the stabilizers are per se known.

The polyolefins to be stabilized may contain other stabilizers in addition to the inventive stabilizers. Examples are phenolic antioxidants, amines, phosphorus compounds, and sulfur compounds.

The use of phenolic antioxidants is obligatory.

The polyolefins may contain other additives typically employed with polyolefins such as pigments, fillers, dyes, antistatic agents, surface conditioning agents, lubricants, plasticizers, flame proofing agents, fireproofing agents, and the like.

The thus stabilized polyolefins are suitable for numerous industrial applications, wherein they may be used in the form thick-walled molded parts, films or fibers.

Having now generally described this invention, a further understanding can be obtained by reference to certain specific examples which are provided herein for purposes of illustration only and are not intended to be limiting unless otherwise specified.

EXAMPLE 1

2,2,6,6-Tetramethyl-4-Piperidinyl Octadecanoate

In a 1-liter four necked flask equipped with a KPG stirrer, internal thermometer, and short helical glass column followed by a Liebig condenser, 448 g (1.5 mol) methyl octadecanoate and 157 g (1.0 mol) 2,2,6,6-tetramethyl-4-piperidinol were heated for 24 hr at 200° C. in the presence of 5 g (8 mmol) dibutyltin dilaurate, with a gentle nitrogen stream being passed through the reaction mixture. A 28 g amount of a distillate was obtained.

Then distillation was carried out on the remaining material, at a maximum bottoms temperature of 193° C. and a pressure of 10 kPa, thereby yielding a distillate comprising 223 g of a recyclable mixture of 2,2,6,6-tetramethyl-4-piperidinol (in the amount of 7.6%), methyl octadecanoate (in the amount of 79.7%), and 2,2,6,6-tetramethyl-4-piperidinyl octadecanoate (in the amount of 9.5%). A 355 g amount of a residue from the raw product remained This was distilled in a thin-layer evaporator at 185° C. and 30 Pa, yielding 13.8 g of a recyclable residue and 337 g (corresponding to 80% yield) of 2,2,6,6-tetramethyl-4-piperidinyl octadecanoate having a m.p. 40.5–41.5° C. and base number of 130 mg KOH/g (theoretical is 132). Taking into account the recyclable parts, the overall yield was 99% (based on the 2,2,6,6-tetramethyl-4-piperidinol).

EXAMPLE 2

1,2,2,6,6-Pentamethyl-4-Piperidinyl Octadecanoate

In a 250-ml three-necked flask equipped with a KPG stirrer, internal thermometer, and short helical glass column followed by a Liebig condenser, 74.6 g methyl octadecanoate and 64.2 g 1,2,2,6,6-pentamethyl-4-piperidinol were heated 6 hr at 200° C. in the presence of 1 g tetraisopropyl titanate, with a gentle nitrogen stream being passed through the reaction mixture A 28 g amount of a distillate was obtained.

The uncoverted 1,2,2,6,6-pentamethyl-4-piperidinol was then removed by distillation at 10 kPa, and the residue was distilled at 20 Pa. A 20.6 g amount of distillate was recovered.

The remaining residue contained raw product in the amount of 107.5 g (purity 93.5% by GC) (corresponding to 98% yield) This material was distilled to yield a colorless solid with a m.p. of 41–43.5° C.

EXAMPLE 3

2,2,6,6-Tetramethyl-4-Piperidinyl Docosanoate

In a 500-ml three-necked flask equipped with a KPG stirrer, internal thermometer, and short helical glass column followed by a Liebig condenser, 102 g (0.3 mol) behenic acid (GC analysis 88.9% docosanoic acid, remainder homologs) and 70.8 g (0.45 mol) 2,2,6,6-tetramethyl-4-piperidinol were heated 24 hr at 200° C. in the presence of 3 g (12 mmol) dibutyltin oxide, with a gentle nitrogen stream being passed through the reaction mixture. A clear, light brown reaction solution was obtained with an acid number of 2.5 mg KOH/g (corresponding to 97.5% conversion), along with 4.5 g of an aqueous distillate.

Then, the excess 2,2,6,6-tetramethyl-4-piperidinol was removed by distillation by heating the reaction mixture to 180° C. at normal pressure, followed by application of a vacuum of about 10 KPa. The remaining material was distilled at a bottoms temperature of up to 200° C. In the process, 21.3 g (90% of the excess) of 2,2,6,6-tetramethyl-4-piperidinol was recovered as a clear, recyclable solid.

The residue contained 135 g raw product (corresponding to 94% yield), with a m.p. of 48–53° C., and a base number of 116 mg KOH/g (theoretical=117). After distillation in a thin-layer evaporator at 210° C. and 30 Pa, a colorless solid was obtained having a m.p. of 50.5–53° C. and an acid number <0.1 mg KOH/g.

EXAMPLE 4

1,2,2,6,6-Pentamethyl-4-Piperidinyl Docosanoate

In a 500-ml three-necked flask equipped with a KPG stirrer, internal thermometer, and short helical glass column followed by a Liebig condenser, 106.3 g (0.3 mol) methyl docosanoate and 77 g (0.45 mol) 1,2,2,6,6-pentamethyl-4-piperidinol were heated 6 hr at 200° C. in the presence of 2 g aluminum triisopropylate, with a gentle nitrogen stream being passed through the reaction mixture.

Then the unconverted 1,2,2,6,6-pentamethyl-4-piperidinol was removed by distillation at 10 kPa, followed by distillation of the residue at 20 Pa. In the process, 24.4 g (95% of the excess) of 1,2,2,6,6-pentamethyl-4-piperidinol was recovered as a clear, recyclable solid.

The residue contained 145.2 g raw product (corresponding to 98% yield). After distillation in a thin-layer evaporator at 220° C. and 40 Pa, a colorless solid was obtained having a m.p. of 53–54° C. and a base number of 117 mg KOH/g.

EXAMPLE 5

Charges each comprising about 800 g polypropylene with a melting index (MFI) 190/5 (DIN 53 735 Code T) of 4 g/10 min and a density of 0.905 were intensively mixed in a laboratory mixer (trade name "Turbula", supplied by the firm Bachofen AG, of Basel) with the following additives (amounts given are based on the weight of the polypropylene):

(i) pentaerythrityltetrakis[3-(3,5-di-t-butyl-4-hydroxyphenyl)propanoate] (0.1 wt. %),
(ii) calcium stearate (0.1 wt. %), and
(iii) the light-stabilizer being tested (0.25–0.5 wt. %).

The powdered granulate thus prepared was passed through a single-shaft extruder at 220° C. to achieve further mixing After the extruded rod of polymer was chopped in a Rotoplex cutting mill (supplied by the firm Alpine), the chopped granulate was injection molded in a screw-type injection molding machine (trade name "Monomat 25", supplied by the firm Krauss-Maffei) at 220°, 270°, and 230° C., to form sheets with dimensions 60×60×1 mm. Test specimens for the tensile strength test (S 2 bars according to DIN 53 504) were stamped out of these sheets. The comparison test specimens required were prepared analogously, but contained the ordinary criterion stabilizer instead of the present stabilizer to be tested.

The light stability was determined by irradiating the test specimens with "Ultra-Vitalux" lamps supplied by the firm Osram, which lamps emit a radiation which emulates solar radiation and is produced with a high pressure mercury lamp element and a tungsten filament. The exposure device was equipped with 16 lamps disposed in a square pattern, which produced an intensity of irradiation of 1 kW/m$^2$ on a square surface 1×1 meter with a distance of 50 cm between the tip of the bulb and the irradiated product. At the location of the test specimens, a black body temperature of 55° C. was achieved. During the irradiation, neither the test specimens nor the air were moistened.

The parameters chosen as measures for the light-stabilizing action of a given stabilizer being investigated were:

(a) The exposure time until initial crack formation on the surface of the irradiated injection-molded sheets; and (b) The half-life, defined as the time of irradiation at which the ultimate tensile strength measured in a tensile test according to DIN 53 455 was reduced to 50% of the starting value.

Table 1 gives the results obtained under these conditions.

The concentration data given in this and all subsequent examples are in weight percent, unless stated otherwise.

TABLE I

Performance of Light Stabilizer

| | Stabilizer | Exposure Time (hr)[1] | Half-life (hr) |
|---|---|---|---|
| Control sample | | 80 | 220 |
| 0.25% | 2,2,6,6-Tetramethyl-4-piperidinol diester of sebacic acid | 520 | 1090 |
| 0.25% | 2,2,6,6-Tetramethyl-4-piperidinyl octadecanoate | 760 | 860 |
| 0.44%[2] | 2,2,6,6-Tetramethyl-4-piperidinyl octadecanoate | 1210 | 1200 |
| 0.25% | 1,2,2,6,6-Pentamethyl-4-piperidinyl octadecanoate | 730 | 780 |
| 0.25% | 2,2,6,6,-Tetramethyl-4-piperidinyl docosanoate | 730 | 600 |
| 0.5%[2] | 2,2,6,6-Tetramethyl-4-piperidinyl docosanoate | 1230 | 1230 |
| 0.25% | 1,2,2,6,6-Pentamethyl-4-piperidinyl docosanoate | 750 | 690 |
| 0.5%[2] | 1,2,2,6,6-Pentamethyl-4-piperidinyl docosanoate | 1200 | 1160 |

[1] Exposure time until surface cracks appear.
[2] These amounts correspond, in concentration of the effective groups, to the addition of 0.25 wt. % of the commercially customarily used stabilizer sebacic acid bis-2,2,6,6-tetramethyl-4-piperidinyl ester (the comparison stabilizer [which is the second entry in Table I]).

EXAMPLE 6

The following substances were incorporated into the polypropylene described in Example 5, in the amounts stated here and using the method described in Example 5:
(a) 0.100% pentaerythrityltetrakis[3-(3,5-di-t-butyl-4-hydroxyphenyl)propanoate],
(b) 0.100% calcium stearate,
(c) 0.125% UV-absorber, and
(d) 0.125–0.250% of the stabilizer to be tested.

The specimens were fabricated and tested analogously to those of Example 5. The results obtained with the stabilizer combinations are shown in Table II. It is evident that the half-life in the tensile test is not a useful measure here. With increasing time after initial surface crack formation, the surface of the test specimens becomes increasingly broken up, with the result that there is increased obstruction to the penetration of harmful UV radiation, as a consequence of more of the radiation being absorbed and scattered. Therefore the decrease in tensile strength does not proceed to the same extent after surface disintegration as occurs with an intact surface.

TABLE II

| Stabilizer Combination | | Exposure Time (hr)[1] | Half-life (hr) |
|---|---|---|---|
| 0.125% | 2,2,6,6-Tetramethyl-4-piperidinol diester of sebacic acid with | 300 | >1400 |
| 0.125% | 2-(3,5-Di-t-amyl-2-hydroxyphenyl)-benzotriazole | | |
| 0.125% | 2,2,6,6-Tetramethyl-4-piperidinyl octadecanoate with | 1080 | >1600 |
| 0.125% | 2-(3,5-Di-t-amyl-2-hydroxyphenyl)-benzotriazole | | |
| 0.220%[2] | 2,2,6,6-Tetramethyl-4-piperidinyl octadecanoate with | 1450 | >2000 |
| 0.125% | 2-(3,5-Di-t-amyl-2-hydroxyphenyl)-benzotriazole | | |
| 0.125% | 2,2,6,6-Tetramethyl-4-piperidinyl docosanoate with | 420 | >1400 |
| 0.125% | 2-(3,5-Di-t-amyl-2-hydroxyphenyl)-benzotriazole | | |
| 0.250%[2] | 2,2,6,6-Tetramethyl-4-piperidinyl docosanoate with | 1320 | >2200 |
| 0.125% | 2-(3,5-Di-t-amyl-2-hydroxyphenyl)-benzotriazole | | |
| 0.125% | 1,2,2,6,6-Pentamethyl-4-piperidinyl docosanoate with | 430 | >1300 |
| 0.125% | 2-(3,5-Di-t-amyl-2-hydroxyphenyl)-benzotriazole | | |
| 0.125% | 2,2,6,6-Tetramethyl-4-piperidinol diester of sebacic acid with | 520 | >1300 |
| 0.125% | 2-hydroxy-4-octoxybenzophenone | | |
| 0.125% | 2,2,6,6-Tetramethyl-4-piperidinyl octadecanoate with | 950 | >1600 |
| 0.125% | 2-Hydroxy-4-octoxybenzophenone | | |
| 0.22%[2] | 2,2,6,6-Tetramethyl-4-piperidinyl octadecanoate with | 1320 | >1900 |
| 0.125% | 2-Hydroxy-4-octoxybenzophenone | | |

[1] Exposure time in hours until initial surface cracks form.
[2] These amounts correspond, in concentration of the effective groups, to the addition of 0.125 wt. % of the commercially customarily used stabilizer sebacic acid bis-2,2,6,6-tetramethyl-4-piperidinyl ester (the comparison stabilizers.

As can be observed from the results summarized in Tables I and II, the combinations of UV-absorbers and monocarboxylate esters of polyalkylpiperidinols have a pronounced synergistic effect in comparison with corresponding combinations with TINUVIN 770 ®.

EXAMPLE 7

Low-pressure polyethylene (HDPE) having a melt index (MFI) 190/5 (DIN 53 735 Code T) of c. 20 g/10 min and a density of 0.962 g/cc, and having a narrow molecular weight distribution, known by its trade name of Vestolen ® A 6016 (supplied by Huels AG), was fabricated into test specimens and irradiated, as described in Example 5. The test specimens were tested analogously to those in the preceding Examples.

TABLE III

| Stabilizer Combination | | Exposure Time (hr)[1] | Half-life (hr) |
|---|---|---|---|
| 0.25% | 2,2,6,6-Tetramethyl-4-piperidinol diester of sebacic acid | 430 | 790 |
| 0.25% | 2,2,6,6-Tetramethyl-4-piperidinyl octadecanoate | 350 | 840 |
| 0.44%[2] | 2,2,6,6-Tetramethyl-4-piperidinyl octadecanoate | 460 | 720 |
| 0.25% | 2,2,6,6-Tetramethyl-4-piperidinyl docosanoate | 450 | >1130 (Major surface damage) |
| 0.50%[2] | 2,2,6,6-Tetramethyl-4-piperidinyl docosanoate | 670 | 710 |
| 0.125% | 2,2,6,6-Tetramethyl-4-piperidinol diester of sebacic acid with | 650 | >1560 (Major surface damage) |
| 0.125% | 5-Chloro-2-(3-t-butyl-2-hydroxy-5-methylphenyl)benzotriazole | | |
| 0.125% | 2,2,6,6-Tetramethyl-4-piperidinyl octadecanoate with | 710 | 1260 |
| 0.125% | 5-Chloro-2-(3-t-butyl-2-hydroxy-5-methylphenyl)benzotriazole | | |
| 0.22%[3] | 2,2,6,6-Tetramethyl-4-piperidinyl octadecanoate with | 980 | 1520 |
| 0.125% | 5-Chloro-2-(3-t-butyl-2-hydroxy-5-methylphenyl)benzotriazole | | |
| 0.125% | 2,2,6,6-Tetramethyl-4-piperidinyl docosanoate with | 770 | 1180 |
| 0.125% | 5-Chloro-2-(3-t-butyl-2-hydroxy-5-methylphenyl)benzotriazole | | |
| 0.25%[3] | 2,2,6,6-Tetramethyl-4-piperidinyl docosanoate with | 950 | 1520 |
| 0.125% | 5-Chloro-2-(3-t-butyl-2-hydroxy-5- | | |

TABLE III-continued

| Stabilizer Combination | Exposure Time (hr)[1] | Half-life (hr) |
|---|---|---|
| methylphenyl)benzotriazole | | |

[1]Exposure time in hours until initial surface cracks form.
[2]See footnote[2] of TABLE I.
[3]See footnote[2] of TABLE II.

EXAMPLE 8

In this Example the substrate was a mixture of polypropylene and EPDM, as used in the automotive industry for manufacturing the likes of bumpers, spoilers, and protective strips. It has the following composition (in parts by weight):

| | |
|---|---|
| Vestolen(R) P 6500 (Huels) | 78 |
| Buna(R) AP 437 (Huels) | 22 |
| Irganox(R) 1010 (Ciba-Geigy) | 0.1 |
| Irganox(R) PS 802 (Ciba-Geigy) | 0.1 |
| Irganox(R) B 225 (Ciba-Geigy) | 0.1 |
| Calcium stearate | 0.1 |
| Luperco(R) 101 XLS (Luperox) | 0.15 |
| Epikote(R) 1004 (Shell) | 0.2 |

Vestolen ® P 6500 is a block copolymer with an MFI 190/5 (DIN 53 735 Code T) of c. 0.5 g/10 min and a density of 0.904. Buna ® AP 437 is an EPDM terpolymer with an elevated ethylene content and a sequence type having a Mooney viscosity ML (1+4) of c. 85 at 100° C. The Irganoxes ® are antioxidants based on (3,5-di-t-butyl-4-hydroxyphenyl)propanoate esters of pentaerythritol or of octadecanol. Luperco ® is a peroxide catalyst. Epikote ® is an epoxide resin.

The principal parameters used as a measure for the light-stabilizing action of the stabilizers being investigated was the exposure time until initial cracks formed on the surface of the irradiated injection-molded sheets.

TABLE IV

| Stabilizer | | Exposure Time (hr)[1] |
|---|---|---|
| 0.5% | 2,2,6,6-Tetramethyl-4-piperidinol diester of sebacic acid | 880 |
| 0.5% | 2,2,6,6-Tetramethyl-4-piperidinyl octadecanoate | 980 |
| 0.5% | 2,2,6,6-Tetramethyl-4-piperidinyl docosanoate | 850 |
| 0.25% | 2,2,6,6-Tetramethyl-4-piperidinol diester of sebacic acid with | 1350 |
| 0.25% | 5-Chloro-2-(3-t-butyl-2-hydroxy-5-methylphenyl)benzotriazole | |
| 0.25% | 2,2,6,6-Tetramethyl-4-piperidinyl octadecanoate with | >2700 |
| 0.25% | 5-Chloro-2-(3-t-butyl-2-hydroxy-5-methylphenyl)benzotriazole | |
| 0.25% | 2,2,6,6-Tetramethyl-4-piperidinyl docosanoate with | >2600 |
| 0.25% | 5-Chloro-2-(3-t-butyl-2-hydroxy-5-methylphenyl)benzotriazole | |

[1]Exposure time (hr) until surface cracks initially appear.

Having now fully described the invention, it will be apparent to one of ordinary skill in the art that many changes and modifications can be made thereto without departing from the spirit or scope of the invention as set forth herein.

What is claimed as new and is intended to be secured by Letters Patent of the United States is:

1. A stabilizer system for stabilization of polyolefins against light, heat, and oxidative degradation, comprising:

(a) a monocarboxylate ester of a polyalkyl-4-piperidinol of the formula:

$$R_1-N\begin{pmatrix} H_3C & CH_3 \\ & \\ H_3C & CH_3 \end{pmatrix}-O-R_2$$

wherein $R_1$ represents hydrogen a $C_{1-5}$ alkyl group, an allyl or benzyl-group, or a $C_{1-4}$ acyl group, and $R_2$ represents a straight or branched chain saturated or unsaturated $C_{16-24}$ aliphatic carboxylic acyl group; and (b) a benzophenone or benzotriazole UV-absorber.

2. The stabilizer system of claim 1, wherein component (a) is 2,2,6,6-tetramethyl-4-piperidinyl octadecanoate.

3. The stabilizer system of claim 1, wherein component (a) is 2,2,6,6-tetramethyl-4-piperidinyl docosanoate.

4. The stabilizer system of claim 1, wherein said benzophenone component is 2-hydroxy-4-octyloxybenzophenone, 4-dodecyloxy-2-hydroxybenzophenone, or 2,4-dihydroxybenzophenone.

5. The stabilizer system of claim 1, where said benzotriazole component is 2-(2-hydroxy-5-methylphenyl)benzotriazole, 2-(3,5-di-t-butyl-2-hydroxyphenyl)benzotriazole, 2-(3-t-butyl-2-hydroxy-5-methylphenyl)benzotriazole, 2-(3,5-di-t-amyl-2-hydroxyphenyl)benzotriazole, 5-chloro-2-(3,5-di-t-butyl-2-hydroxyphenyl)benzotriazole, or 5-chloro-2-(3-t-butyl-2-hydroxy-5-methylphenyl)benzotriazole.

6. The stabilizer system of claim 1, wherein said polyolefin is polyethylene, polypropylene, polyisobutylene, poly-1-butene, poly(methyl-1-pentene), polyisoprene, polybutadiene, polycyclopentene, polycyclopentadiene or mixtures thereof.

7. The stabilizer system of claim 1, wherein said polyolefin is an ethylene-propylene-(buta)diene terpolymer.

8. The stabilizer system of claim 1, wherein said polyolefin is a copolymer of an olefin with an alkyl (meth)acrylate, acrylonitrile, vinyl acetate, styrene or methylstyrene.

9. The stabilizer system of claim 1, wherein the monocarboxylic acid of said ester is a behenic acid composition.

10. A composition comprising polyolefin and from 0.01-5 wt. % of the stabilizer system of claim 1.

11. A composition of claim 10, comprising from 0.05-1 wt. % of said stabilizer system.

12. A method for stabilizing polyolefins against light, heat and oxidative degradation comprising incorporating into the polyolefin an effective amount of the stabilizer system of claim 1.

13. A method of claim 12, wherein said effective amount of said stabilizing system is from 0.01-5 wt. %.

14. A method of claim 12, wherein said effective amount is from 0.01-1 wt. %.

* * * * *